US009957018B1

(12) United States Patent
Angeliev

(10) Patent No.: US 9,957,018 B1
(45) Date of Patent: May 1, 2018

(54) SYSTEM FOR WAVE AMPLIFYING, WAVE ENERGY HARNESSING, AND ENERGY STORAGE

(71) Applicant: Cvetan Angeliev, Toronto (CA)

(72) Inventor: Cvetan Angeliev, Toronto (CA)

( * ) Notice: Subject to any disclaimer, the term of this patent is extended or adjusted under 35 U.S.C. 154(b) by 0 days. days.

(21) Appl. No.: 15/675,150

(22) Filed: Aug. 11, 2017

Related U.S. Application Data

(60) Provisional application No. 62/455,900, filed on Feb. 7, 2017.

(51) Int. Cl.
| | |
|---|---|
| *F03B 13/10* | (2006.01) |
| *F03B 13/12* | (2006.01) |
| *H02P 9/04* | (2006.01) |
| *B63B 35/44* | (2006.01) |
| *F03B 13/18* | (2006.01) |
| *F03B 15/00* | (2006.01) |
| *F03G 3/00* | (2006.01) |
| *F03G 7/08* | (2006.01) |
| *B63B 1/10* | (2006.01) |
| *B63B 39/03* | (2006.01) |
| *G05D 1/04* | (2006.01) |
| *F16D 41/12* | (2006.01) |
| *H02K 7/18* | (2006.01) |
| *H02K 7/07* | (2006.01) |
| *F16D 31/02* | (2006.01) |
| *F03B 17/02* | (2006.01) |

(52) U.S. Cl.
CPC ............. *B63B 35/44* (2013.01); *B63B 1/107* (2013.01); *B63B 39/03* (2013.01); *F03B 13/18* (2013.01); *F03B 15/00* (2013.01); *F03G 3/00* (2013.01); *F03G 7/08* (2013.01); *F16D 41/12* (2013.01); *G05D 1/048* (2013.01); *H02K 7/07* (2013.01); *H02K 7/1853* (2013.01); *H02P 9/04* (2013.01); *B63B 2035/446* (2013.01); *B63B 2035/4453* (2013.01); *B63B 2035/4466* (2013.01); *F05B 2220/706* (2013.01); *F05B 2240/97* (2013.01); *F05B 2260/421* (2013.01); *F05B 2260/503* (2013.01)

(58) Field of Classification Search
USPC ....... 290/42, 53; 60/398, 496, 497, 506, 197
See application file for complete search history.

(56) References Cited

U.S. PATENT DOCUMENTS

| | | | | |
|---|---|---|---|---|
| 643,557 A | * | 2/1900 | Swearingen | ........ F03B 13/1815 60/505 |
| 1,887,316 A | * | 11/1932 | Lockfaw | ............... F03B 13/182 417/330 |

(Continued)

*Primary Examiner* — Pedro J Cuevas
(74) *Attorney, Agent, or Firm* — Nasser Ashgriz; UIPatent Inc.

(57) ABSTRACT

The present invention is related generally to electric energy production and storage and more particularly to three devices that can work independently or as a system for generating, storing and retrieving of significant volume of "green" electric energy from sea and ocean waves. The present invention comprises of three module systems for wave power amplifying, wave power harnessing and conversion to electric energy, and energy storage. The system could double the height and quadruple the power of any wave, harness and convert all the wave power to electrical energy, store it without loss for as long as needed, and release it when and as needed.

5 Claims, 14 Drawing Sheets

(56) References Cited

U.S. PATENT DOCUMENTS

| | | | | |
|---|---|---|---|---|
| 3,668,412 A * | 6/1972 | Vrana | F03B 13/262 | 290/53 |
| 3,706,507 A * | 12/1972 | Dunbar | F03B 13/262 | 415/5 |
| 3,746,875 A * | 7/1973 | Donatelli | F03B 13/145 | 290/42 |
| 3,959,663 A * | 5/1976 | Rusby | F03B 13/262 | 290/53 |
| 3,974,652 A * | 8/1976 | Lovmark | F03B 13/1815 | 417/332 |
| 4,098,084 A * | 7/1978 | Cockerell | F03B 13/20 | 417/332 |
| 4,295,800 A * | 10/1981 | Packer | F03B 13/1815 | 417/333 |
| 4,408,455 A * | 10/1983 | Montgomery | F03B 13/1815 | 60/497 |
| 4,426,950 A * | 1/1984 | Cholet | B63G 8/14 | 114/245 |
| 4,434,375 A * | 2/1984 | Taylor | F03B 13/1885 | 290/53 |
| 4,560,884 A * | 12/1985 | Whittecar | F03B 13/1815 | 290/42 |
| 4,610,140 A * | 9/1986 | Thompson, Jr. | F03B 13/1815 | 474/148 |
| 4,612,768 A * | 9/1986 | Thompson, Jr. | F03B 13/1815 | 60/506 |
| 4,622,473 A * | 11/1986 | Curry | F03B 13/187 | 290/1 R |
| 5,132,550 A * | 7/1992 | McCabe | B01D 61/10 | 290/53 |
| 5,405,250 A * | 4/1995 | Vowles | F03B 13/1815 | 417/331 |
| 5,929,531 A * | 7/1999 | Lagno | F03B 13/262 | 290/42 |
| 6,109,029 A * | 8/2000 | Vowles | B01D 61/10 | 270/42 |
| 6,644,027 B1 * | 11/2003 | Kelly | F03B 13/1845 | 60/498 |
| 6,700,217 B1 * | 3/2004 | North | F03B 13/148 | 290/42 |
| 6,814,633 B1 * | 11/2004 | Huang | B63H 19/02 | 440/9 |
| 7,199,481 B2 * | 4/2007 | Hirsch | F03B 13/1845 | 290/42 |
| 7,242,106 B2 * | 7/2007 | Kelly | F03B 13/1855 | 290/42 |
| 7,298,054 B2 * | 11/2007 | Hirsch | F03B 13/1845 | 290/42 |
| 7,385,301 B2 * | 6/2008 | Hirsch | F03B 13/1845 | 290/42 |
| 7,476,137 B2 * | 1/2009 | Stewart | F03B 13/1815 | 290/42 |
| 7,476,986 B1 * | 1/2009 | Del Principe | F03B 13/185 | 290/42 |
| 7,498,685 B2 * | 3/2009 | Turner | F03B 13/1845 | 290/42 |
| 7,536,859 B2 * | 5/2009 | Tai | F03B 13/181 | 290/42 |
| 7,629,703 B2 * | 12/2009 | Storbekk | F03B 13/186 | 290/42 |
| 7,737,568 B2 * | 6/2010 | Vowles | F03B 13/14 | 290/42 |
| 7,755,211 B2 * | 7/2010 | Montgomery | F03B 13/1865 | 290/42 |
| 7,823,380 B2 * | 11/2010 | Ghouse | F03B 13/147 | 60/496 |
| 7,872,363 B2 * | 1/2011 | Morse | B63B 35/00 | 290/42 |
| 7,956,479 B1 * | 6/2011 | Bergman | F03B 13/187 | 290/53 |
| 8,035,243 B1 * | 10/2011 | Mesa | F03B 13/1815 | 290/42 |
| 8,080,893 B2 * | 12/2011 | Lin | F03B 13/186 | 290/42 |
| 8,093,736 B2 * | 1/2012 | Raftery | F03B 13/1885 | 290/42 |
| 8,123,579 B2 * | 2/2012 | Gerber | B63B 22/00 | 114/121 |
| 8,132,406 B2 * | 3/2012 | Thompson, Jr. | F03B 13/262 | 290/42 |
| 8,264,095 B2 * | 9/2012 | Camp | F03B 13/181 | 290/42 |
| 8,317,555 B2 * | 11/2012 | Jacobsen | B63C 11/52 | 114/312 |
| 8,333,070 B2 * | 12/2012 | Huang | F03B 13/06 | 60/495 |
| 8,429,910 B2 * | 4/2013 | Ghouse | F03B 13/1815 | 417/100 |
| 8,508,063 B2 * | 8/2013 | Rhinefrank | F03B 13/20 | 290/53 |
| 8,536,724 B2 * | 9/2013 | Dullaway | F03B 13/1815 | 290/53 |
| 8,614,520 B2 * | 12/2013 | Rohrer | F03B 13/182 | 290/42 |
| 8,912,678 B2 * | 12/2014 | Nozawa | F03B 13/186 | 290/42 |
| 9,018,785 B2 * | 4/2015 | Chua | F03B 13/1815 | 290/42 |
| 9,127,640 B2 * | 9/2015 | Rohrer | F03B 13/182 | |
| 9,371,816 B2 * | 6/2016 | Cho | F03B 13/1855 | |
| 9,683,543 B2 * | 6/2017 | Nozawa | F03B 13/186 | |
| 9,863,395 B2 * | 1/2018 | Rohrer | F03B 13/186 | |
| 2002/0067043 A1 * | 6/2002 | Ovadia | F03B 13/1815 | 290/53 |
| 2006/0208494 A1 * | 9/2006 | Cook | F03B 13/20 | 290/53 |
| 2008/0016863 A1 * | 1/2008 | Tai | F03B 13/186 | 60/497 |
| 2010/0213710 A1 * | 8/2010 | Rhinefrank | F03B 13/20 | 290/42 |
| 2011/0006531 A1 * | 1/2011 | Ghouse | F03B 13/1815 | 290/53 |
| 2011/0068579 A1 * | 3/2011 | Dullaway | F03B 13/1815 | 290/53 |
| 2012/0032444 A1 * | 2/2012 | Burton | F03B 13/145 | 290/53 |
| 2012/0087732 A1 * | 4/2012 | Gray | E02B 9/08 | 405/76 |
| 2012/0317970 A1 * | 12/2012 | Edvardsen | F03B 13/189 | 60/496 |
| 2013/0113211 A1 * | 5/2013 | Rohrer | F03B 13/182 | 290/42 |
| 2014/0097617 A1 * | 4/2014 | Rohrer | F03B 13/182 | 290/42 |
| 2015/0082785 A1 * | 3/2015 | Rohrer | F03B 13/182 | 60/500 |

* cited by examiner

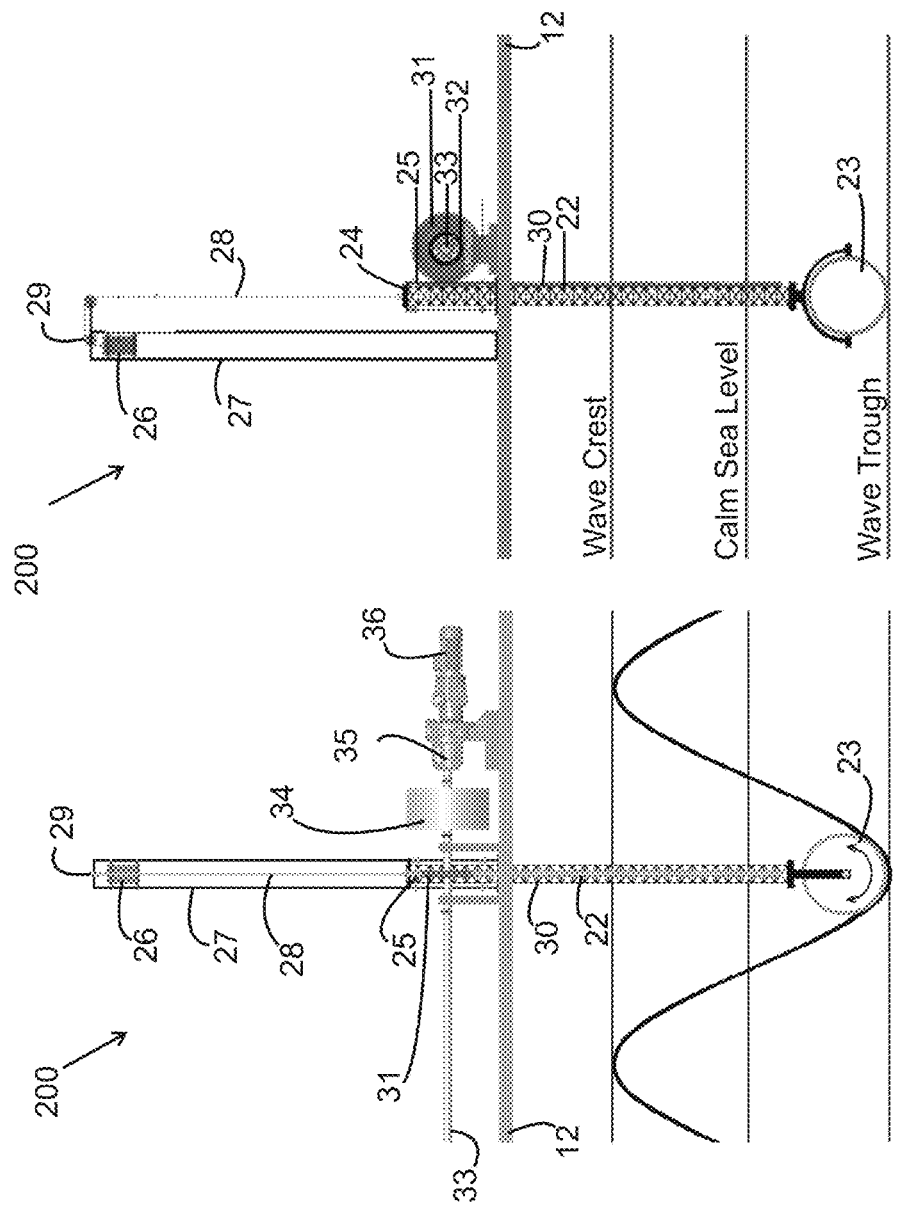

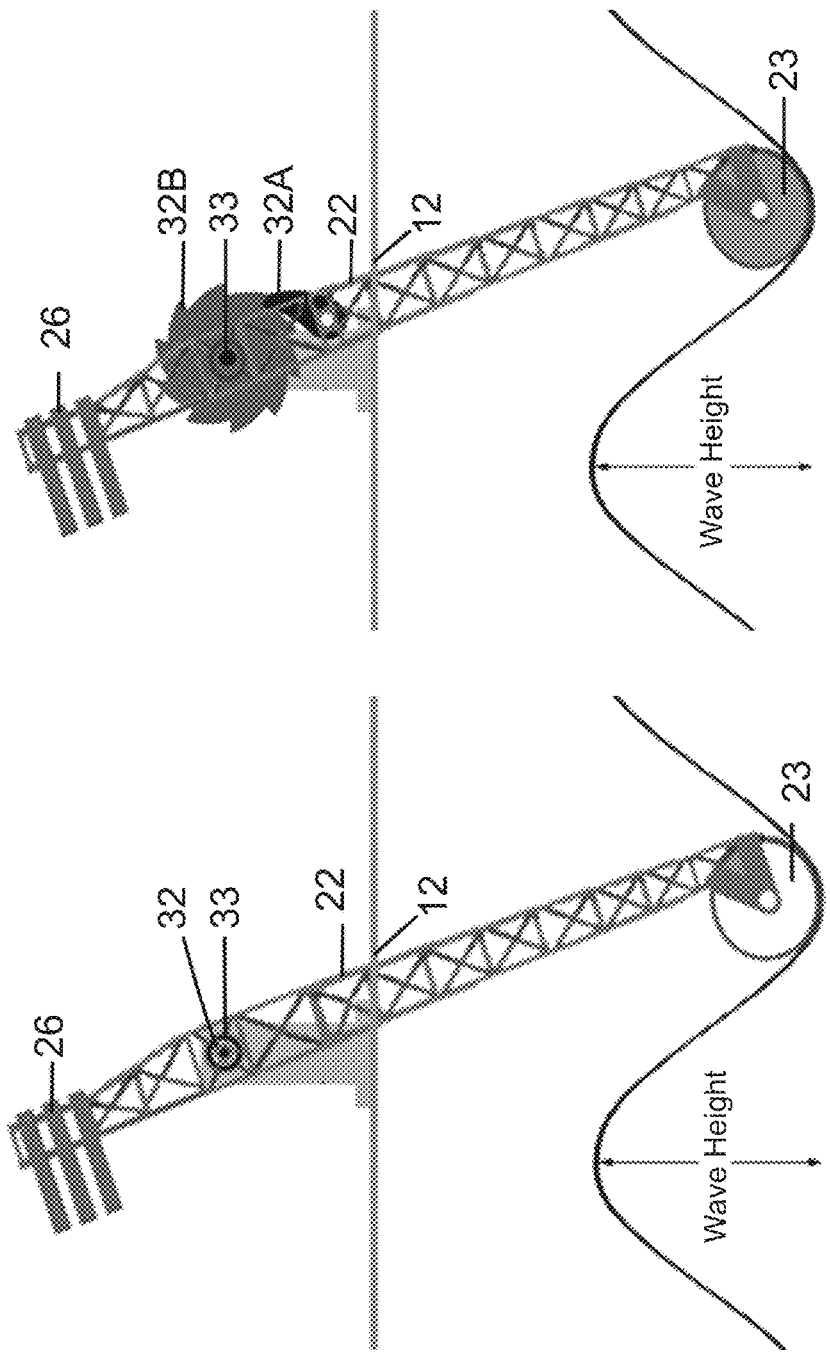

SYSTEM FOR WAVE AMPLIFYING, WAVE ENERGY HARNESSING, AND ENERGY STORAGE

RELATED APPLICATION

This application claims the benefit of the US. Provisional patent application No. 62/455,900 filed on Feb. 7, 2017.

FIELD OF THE INVENTION

The present invention relates, in general, to energy generation and energy storage, and in particular, to systems for wave amplifying, wave energy harnessing, and gravitational energy storage.

BACKGROUND OF THE INVENTION

The ocean's waves harbor tremendous amounts of raw energy and represent the single largest untapped source of renewable energy. Converted into electricity, wave energy could potentially satisfy all of current global power demands.

It is estimated that 0.1% of the energy in ocean waves can supply the entire world's energy requirements five times over. However, there are only a few commercial wave energy harnessing facilities in the world at the moment. No-one has yet managed to produce wave energy harvesting machines that can withstand the rough and tumble of the seas and produce electricity round the clock for sustained periods.

Once the wave energy is harvested, an industrial or grid scale energy storage system is needed to manage the power. Energy storage is needed to "balance load" and to shift energy consumption into the future, often by several hours, so that more existing generating capacity is used efficiently. The energy storage is used to "bridge" power to ensure there is no brake in service during the seconds-to-minutes required to switch from one power generation source to another. The "power quality management" controls the voltage and frequency to avoid damage to sensitive equipment. Energy storage is also important at the grid scale. It fundamentally improves the way electricity is generated, delivered and consumed. It helps during emergencies like power outages from storms, equipment failures, accidents or even terrorist attacks. But the game-changing nature of energy storage is its ability to balance power supply and demand instantaneously, which makes power networks more resilient, efficient and cleaner.

There are six main energy storage systems deployed around the world:

Solid State Batteries—a range of electrochemical storage solutions, including advanced chemistry batteries and capacitors. Batteries are the most common form of energy storage. However, they are expensive to acquire and maintain, and involve risks of environmental damage.

Flow Batteries—batteries where the energy is stored directly in the electrolyte solution for longer cycle life, and quick response times.

Flywheels—mechanical device that harness rotational energy to deliver instantaneous electricity.

Compressed Air Energy Storage—utilizing compressed air to create a potent energy reserve, techniques of storing air and liquids under pressure for later release are usually limited to small installations used to drive a motor or pump for a limited time and application.

Thermal—capturing heat and cold to create energy on demand.

Pumped Hydro-Power—creating large-scale reservoirs of gravitational energy with water.

Some companies are currently creating gravitational systems that move gravel-loaded railroad cars up the side of a hill and when energy is needed, the gravel-loaded cars are released and their downhill ride drives a mechanical system that drives a generator and generates electricity.

Each of these prior art energy storage techniques have their advantages and limitations depending on the availability of water, varying elevations, and availability of technical service for frequent maintenance.

Currently the most common type of energy storage is pumped hydroelectric facilities. This utility-scale gravity storage technology has been employed for the better part of the last century in the United States and around the world. Pumped hydro-power facilities use pumps to elevate water into a retainer pool behind a dam, creating an on-demand energy source that can be unleashed rapidly. When the grid needs more energy, the water is released to drive turbines at lower elevation to produce electricity.

The main disadvantage of pumped hydro is the special nature of the site required, needing both geographical height and water availability. Suitable sites are therefore likely to be in hilly or mountainous regions, and potentially in areas of outstanding natural beauty, and therefore there are also disturbing social and ecological issues.

The power storage module of the present invention shares similar technique and performance characteristics to pumped-hydro power and is directed mainly to utilities to help lower the price of peak demand power, prevent outages, and reduce the need to build new distribution and transmission lines. The cheap bulk energy storage can add flexibility to the energy system overall. It can help nuclear power follow the curve of electrical demand. It can also help the grid stay available and stable.

Especially for solar and wind power plants, cheap bulk energy storage can be a force multiplier. The invention can help the grid soak up extra solar power for the hours after sunset. It can soak up extra wind power from a breezy morning to use in the afternoon peak or it can dispatch saved up power to cover for an unexpected degree of cloudiness or a shortfall of wind.

SUMMARY OF THE INVENTION

The present invention is related to an electric energy production and storage system comprising three modules for (i) wave power amplifying, (ii) wave power harnessing and conversion to electric energy, and (iii) gravitational energy storage and retrieval.

The function of the Wave Amplifier module is based on what is known as wave shoaling, and the design is based on a modified semisubmersible floating platform. The Wave Amplifier comprises an array of plates, sloping at a moderate angle, installed on the lower submerged section of a modified semisubmersible floating platform, and the low end of the sloping plate extends below the wave base of the longest potential waves for the area. The Wave Amplifier is situated in front of a Wave Power Harvester rig and is linked to it. Acting as a false near-shore sea floor and shallow ocean water, the Wave Amplifier's sloping plate causes decrease of waves' speed and length and increase of their height and energy per unit of wave-crest length. The hollow columns of the modified semisubmersible floating platform provide additional controllable buoyancy allowing the Wave Amplifier module to be lowered deeper in the water when high waves are present and no wave amplifying is needed, or to be raised higher when lower waves come, or to be raised up to the surface for maintenance, repair or transport to a different location.

Wave shoaling is an effect by which waves entering shallower water change their wave height. It is caused by the fact that the group velocity, which is also the wave-energy-transport-velocity, changes with water depth. Under stationary conditions, a decrease in transport speed must be compensated by an increase in energy density in order to maintain a constant energy flux. Shoaling waves also exhibit a reduction in wavelength while the frequency remains constant.

In shallow water and parallel depth contours, non-breaking waves will increase in wave height as the wave packet enters shallower water. This is particularly evident for tsunamis as they wax in height when approaching a coastline, with devastating results. The Wave Amplifier, with its sloping Shoaling Plate acting as an artificial near-shore ocean/sea floor and shallower water, is positioned preferably a few kilometers from the shore where water depth is more than the wave base of the prevailing waves for the area (wave base=½ wave length).

The Wave Amplifier's modified semisubmersible floating platform provides a steady support to the submerged sloping shoaling plate, so it can act as a "solid" near-shore ocean/sea floor and shallower water, resist the downward force of the waves and cause them to rise higher.

Facing the wave front and imitating sloping shallow ocean water near shore, the Wave Amplifier would double any wave's height and quadruple its energy per unit of wave-crest length. Because the rear high end of the shoaling plate needs to continuously be maintained at 1.3 times wave height below wave trough for maximum wave height amplification and to avoid wave break, the buoyancy of the semisubmersible platform is adjusted automatically to maintain continuously the position of the rear high end of the shoaling plate at 1.3 times wave height below wave trough.

The Wave Amplifier system is delivered and anchored to the ocean/sea floor of a location preferably a few kilometers from the shore with sufficient depth that does not interfere with the prevailing waves for the region, and sunk down to a point where the high rear end of the Wave Amplifier's shoaling plate is at 1.3 times the wave height below wave through. The sloping shoaling plate must be long enough so its lower front end is below the waves' wave base. As long waves approach and travel above the sloping shoaling plate, their interaction with the sloping plate causes bunching, compressing them into shorter horizontal distances and increasing their height.

A wave height sensor continuously monitors the height of the waves above the high rear end of the shoaling plate and sends a signal to a buoyancy control unit in the system to inject air into the platform's buoyancy control columns through air-in/out port and expel some of the water in them through water-in/out port increasing the buoyancy of the semisubmersible floating platform and raising the system up when a lower wave comes and the higher end of the shoaling plate needs to be lifted up to within the required 1.3 times wave height below wave trough to maximum amplify the height of the following waves.

When higher waves come, the wave height sensor sends a signal to the buoyancy control unit to release air from the platform's buoyancy control columns through air-in/out port and let in more water in them through water-in/out port decreasing the buoyancy of the semisubmersible platform and lowering the system deeper so the rear high end of the shoaling plate is lowered to within the required 1.3 times wave height below wave trough to avoid waves break.

The Wave Amplifier is configured so that the total weight of the system is balanced by the buoyancy of the empty ballast tanks of the semisubmersible platform and the system can float on the water surface. By adding water to the empty ballast tanks, the total system weight is increased and the device can be sunken to the needed working depth: high rear end of the shoaling plate at 1.3 times wave height below wave trough.

The Wave Power Harvester comprises of a plurality of rows and a plurality of wave energy harnessing elements in each row engaged to a common shaft installed on a semisubmersible floating platform (a stationary platform could be used on suitable sites). A wave energy harnessing element consists of a counterbalanced mast and a float attached to the lower end of the vertical mast. The float sits on the water surface and follows the up-down movement of waves raising and lowering the mast. A straight gear rack is installed on the mast and a spur gear wheel is engaged to the rack. A ratchet or a one-way clutch/bearing press-fit in or mounted on the spur gear wheel engaged with the gear rack converts the mast-rack assembly's up-down movement into one-way rotational and turns a shaft with a flywheel which maintains a steady rotation. A speed-increasing gearbox and a power generator linked to the speed-increasing gearbox are provided to generate electricity. A submarine power cable connects the Wave Power Harvester module to a substation onshore and the generated energy is delivered to the grid or to the Gravitational Power Storage module.

During low grid power demand and lack of available energy storage capacity, the volume of Wave Power Harvester-generated power can be reduced by locking some or all of the float-mast assemblies in top raised position disengaging them from the waves and the power generation process, or disengaging a generator from a rotating shaft. Another approach to reducing the output of the Wave Power Harvester is interrupting the work of the Wave Amplifier described above by lowering the module deeper in the water eliminating its wave-amplifying effect.

Because ocean waves run non-stop day and night and the Wave Power Harvester module can generate electric energy 24/7, it is a logical and preferred approach to store any excess energy, not needed immediately by the grid, in a Gravitational Power Storage facility and inject it into the grid when and as needed.

The Gravitational Power Storage module is presented in two main versions: (i) a single vertical shaft bored into the ground and a single solid mass element transported up-down inside the vertical shaft by an elevator system powered by an electric motor-generator to absorb and retrieve energy; and (ii) two or more deep vertical shafts bored into the ground at a certain distance apart connected by one or more horizontal rail-tracked tunnels at a number of levels serving as underground storage area for "discharged" wheeled solid mass elements. A surface-level rail yard serves as storage area for "charged" wheeled solid mass elements. Elevator cages, powered by electric motor-generator, move the wheeled solid mass elements up and down inside the vertical shafts between the surface and the tunnel weight-storage areas to store and retrieve electric energy. Using power generated by the Wave Power Harvester (or another source), the motor function of the electric motor-generator raises the solid mass elements from the underground storage tunnels to the surface rail yard increasing their gravitational potential energy and stores the absorbed electric energy as gravitational potential energy by storing the "charged" solid mass elements at the surface storage rail yard. The system releases the stored energy when the solid mass elements are allowed to descend controllably by gravity from the surface level to the underground horizontal storage tunnels rotating the elevator's electric motor-generator whose generator function produces electric energy. The regenerated electric energy is delivered to the grid.

It is an object of the present invention to provide a system for generating, storing and retrieving the largest possible volume of "green" electric energy from sea and ocean waves.

It is another object of the present invention to provide a relatively low cost and reliable energy storage system and method that can be used by utilities to transfer low-price night-time-produced energy by conventional power plants to high-price electric power during peak demand times.

It is another object of the present invention to produce wave energy harvesting machine that can withstand the rough and tumble of the sea and produce electricity for sustained periods.

It is another object of the present invention to provide an energy storage system and method to supplement the output of alternative and/or on-site power generation sources during times when they cannot produce enough electricity.

It is a further object of the present invention to provide an energy storage and delivery system and method that assist in load balancing of distribution networks and to allow energy delivery "scheduling" from alternative energy sources such as solar, wind and wave.

BRIEF DESCRIPTION OF THE DRAWINGS

One or more aspects of the present invention are particularly pointed out and distinctly claimed as examples in the stated claims. The foregoing and other objects, features, and advantages of the invention are apparent from the following detailed description taken in conjunction with the accompanying drawings in which:

FIG. 4 presents a side view of a vertical counterbalanced mast wave power harvesting element, shaft, flywheel and generator according to the present invention;

FIG. 5 presents a front view of a vertical counterbalanced mast wave power harvesting element including a one-way clutch power transfer mechanism;

FIG. 11 shows a single balanced torque arm wave power harvesting element of the system on FIG. 9 with a float, a balancing counterweight and a one-way-clutch power transfer mechanism engaging a shaft;

FIG. 12 shows a single balanced torque arm wave power harvesting element of the system on FIG. 9 with a float, a balancing counterweight and a ratchet gear power transfer mechanism engaging a shaft;

DETAILED DESCRIPTION OF THE DRAWINGS

Aspects of the present invention and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure.

Figure 1:
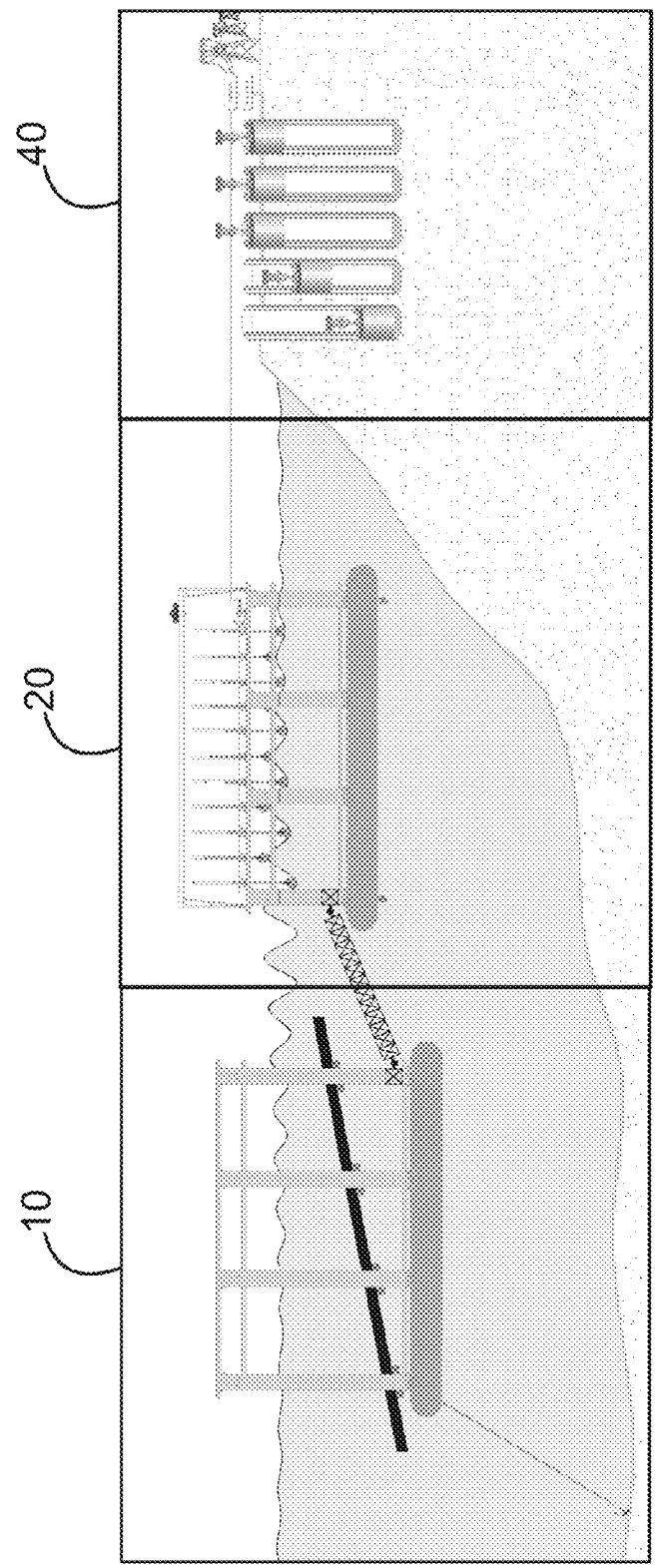
FIG. 1 depicts a side view of the three modules of the system: A) Wave amplifier, B) Wave power harvester, C) Power storage facility.

According to FIG. 1 the present invention 100 is an energy production and storage system comprising of three modules: (i) a water wave amplifier module 10, (ii) a water wave power harvesting module 20, and (iii) an energy storage and retrieval module 40.

The water Wave Amplifier module 10 of the present invention comprises an array of plates 11 sloping at a moderate angle and installed at the bottom section of a modified semisubmersible floating platform 12 and submerged below the waves' wave base 14. The wave base is the depth of influence of a water wave, which is about half the wavelength. The device acts as a false near-shore ocean/sea floor to form a shallow water region. The shallow water region decreases the wave's speed and length, and increases its height and energy per unit of wave-crest length, resulting in a higher power generation capacity and further energy utilization from the incoming waves. By maintaining the rear high end of the Wave Amplifier's sloping shoaling plate 11 at 1.3 times below wave's trough, the Wave Amplifier can double the height of any wave provided the front lower end of the sloping shoaling plate 11 is positioned below the waves' wave base 14. The Wave Amplifier module 10 can double the height and quadruple the energy of any wave.

The Wave Power Harvester module 20 can be designed to handle waves with any height amplified by the Wave Amplifier. By combining the two modules, the Wave Power Harvester module 20 can extract four times more wave energy from the site than without the Wave Amplifier. When not immediately needed by the grid, all the power generated by the Wave Power Harvester module 20 will be stored in the Power Storage module 40 of the system 100.

Figure 2:
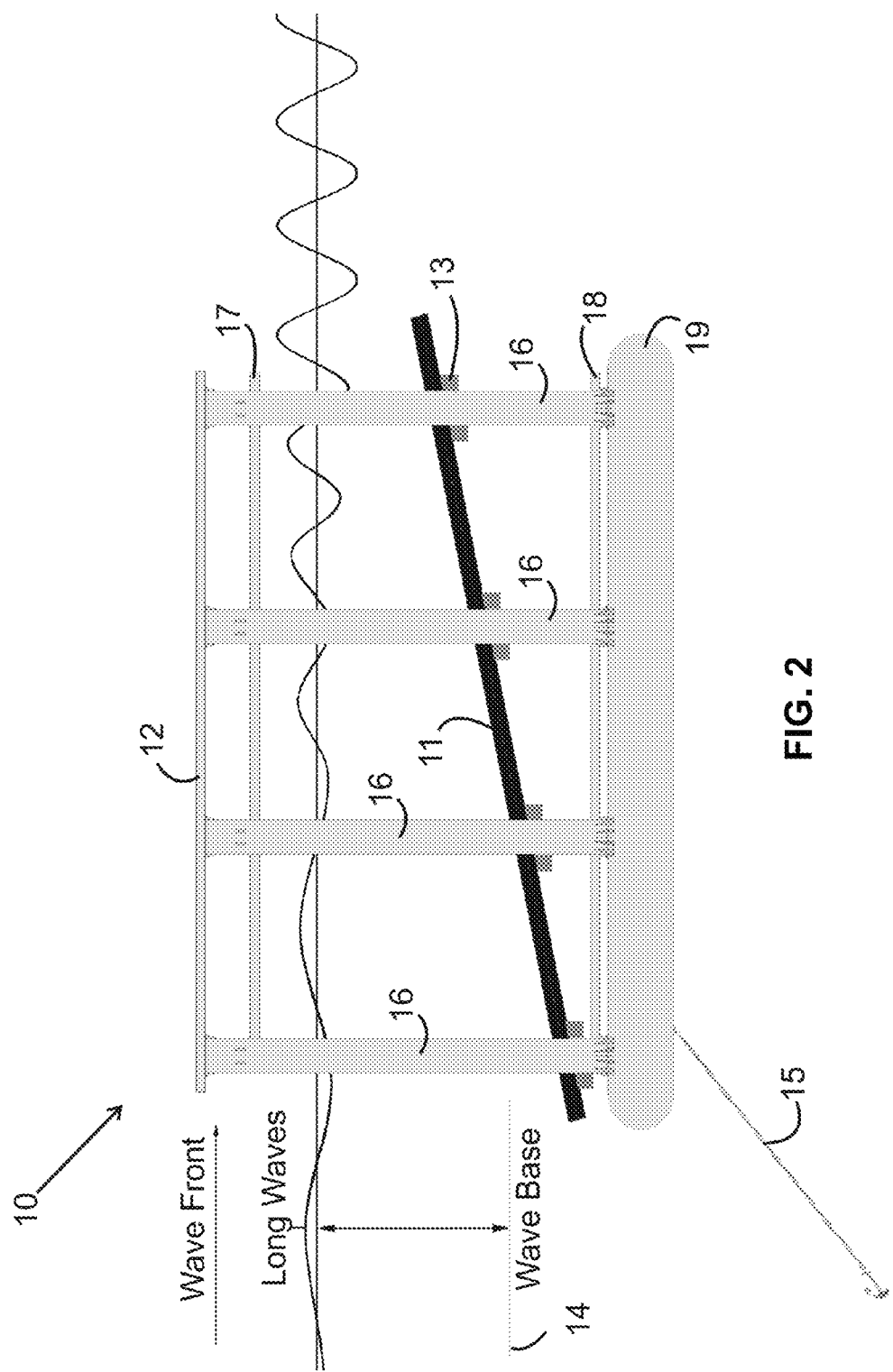
FIG. 2 shows a side view of the Wave amplifier according to the present invention.
Figure 3:
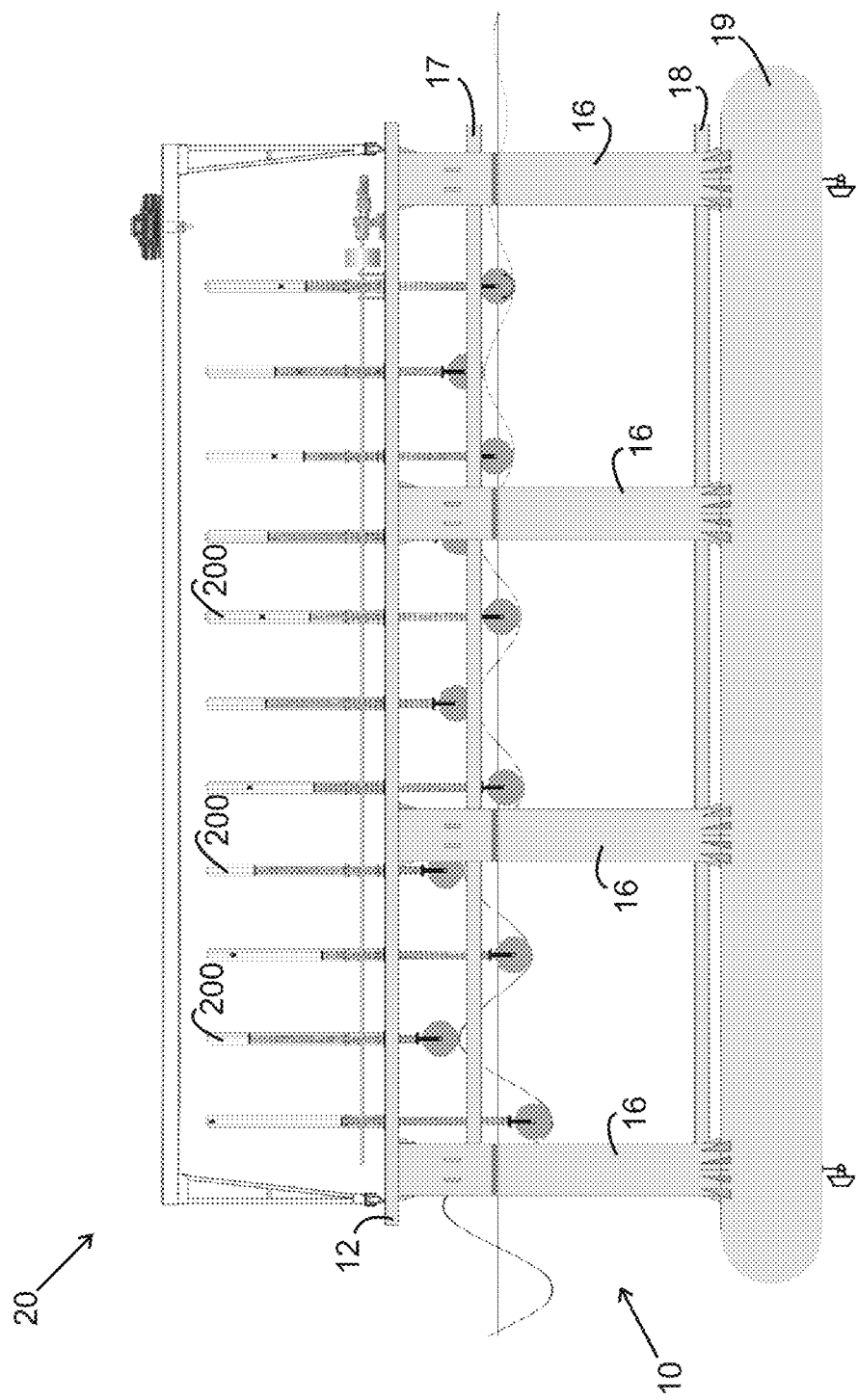
FIG. 3 shows a side view of the Wave power harvester according to the present invention.

FIG. 2 shows the Wave Amplifier module 10 of the present invention comprising a shoaling plate 11; and a semisubmersible floating platform 12 supporting shoaling plate 11. The shoaling plate 11 is mounted on a plurality of shoaling plate supports 13 and permanently affixed at an angle to the bottom section of the semisubmersible floating platform 12. The Wave Amplifier 10 with sloping shoaling plate 11 acting as an artificial near-shore ocean/sea floor and shallower water is positioned preferably a few kilometers from the shore where water depth is more than the wave base 14 of the prevailing waves in the area. In such a setting, the wave shoaling effect caused by the sloping shoaling plate 11 of the Wave Amplifier is expected to double the waves' height. The increase in the height of the wave depends on the wave length (period) and the slope of the shoaling plate 11.

The semisubmersible floating platform 12 of the Wave Amplifier 10 provides a steady support to the submerged sloping shoaling plate 11 so that it can act as a "solid" near-shore ocean/sea floor and shallower water and resist the downward force of the waves and cause them to rise higher. Unlike the conventional offshore semisubmersible floating platforms, the decks of which are needed to support heavy machinery and equipment for oil and gas industry's operations, the present semisubmersible floating platform 12 does not have and does not need a functional deck above the water. Instead of a deck, the present semisubmersible floating platform 12 supports the submerged shoaling plate 11 installed at an angle at the bottom of the platform.

Because the rear high end of the shoaling plate 11 is preferably maintained at 1.3 times wave height below wave trough for maximum wave height amplification and to avoid wave break, the buoyancy of the semisubmersible floating platform 12 is adjusted automatically to continuously maintain the position of the rear high end of the shoaling plate 11 at 1.3 times wave height below wave trough.

Imitating a near-shore ocean/sea floor and shallower water, the disclosed system for sea and ocean wave height and power amplifying may find application in enhancing the capacity of wave power harvesting devices and creating new and more exciting wave surfing sites.

The Wave Amplifier 10 is delivered to a location preferably a few kilometers from the shore with sufficient depth that does not interfere with the prevailing waves for the region, and let it sink down to a point where the lower front end of the shoaling plate 11 is below the waves' wave base 14, and is anchored to the ocean/sea floor with an anchor 15.

As long waves approach and travel above the sloping shoaling plate 11, their interaction with the sloping shoaling plate 11 causes bunching, compressing them into shorter horizontal distances, and increasing their height.

A wave height sensor (not shown) continuously monitors the height of the waves above the high end of the shoaling plate 11 and sends a signal to a buoyancy control unit (not shown) to inject air into platform buoyancy control columns 16 through air-in/out port 17 and expel some of the water in them through water-in/out port 18, increasing the buoyancy of the semisubmersible floating platform 12, and raising the system up when lower waves come. The higher end of the shoaling plate 11 needs to be lifted up to within a required value, preferably 1.3 times wave height below wave trough to maximize the wave amplification.

When higher waves come, the wave height sensor (not shown) sends a signal to the buoyancy control unit (not shown) to release air from the platform buoyancy control columns 16 through air-in/out port 17 and let in more water through water-in/out port 18 decreasing the buoyancy of the semisubmersible floating platform 12 and lowering the system deeper, so the high rear end of the shoaling plate 11 is lowered to within the required 1.3 times wave height below wave trough to avoid waves break.

The Wave Amplifier 10 is configured so that the total weight of the system is balanced by the buoyancy of the empty ballast tanks 19 of semisubmersible platform 12 and the system can float on the water surface. By adding ballast medium (water) to the empty ballast tanks 19, the total system weight is increased and the device can be sunken to the needed working depth: high rear end of the Shoaling Plate 11 at 1.3 times wave height below wave trough. For system maintenance and repair, the ballast tanks 19 are emptied and the Wave Amplifier 10 is brought back to the water surface.

The Wave Power Harvester system 20 module is shown in FIGS. 3 to 8. The Wave Power Harvester system 20 comprises of plurality of vertical mast-wave-energy-harnessing elements 200 installed on a floating (or stationary) platform 12 deck. The vertical mast wave energy harnessing elements 200 may include a float 23, a vertical mast 22, a mast-guiding frame 24, mast-guiding wheels 25, a counterbalance weight 26, a counterbalance weight guiding track/frame 27, a counterbalance weight rope/chain 28, counterbalance weight rope/chain guiding pulleys/sprockets 29, a straight rack gear 30 installed on the vertical mast 24, a spur gear 31 with tight fit in or attached on one-way clutch/modified ratchet 32, a shaft 33 collecting energy from the wave energy harnessing elements 22, a flywheel 34, a gearbox speed increaser 35, and a power generator 36.

High buoyancy float 23, installed at the bottom end of the vertical mast 22, sits on the water surface at a sea or an ocean site. When the float 23 sits in the trough of the highest wave possible in a specific area, the tall mast 22 extends from the top of the float 23 to above the top of the mast guide frame 24 installed on deck 12. The mast guiding wheels 25, installed on the mast guiding frame 24, guide the mast 22 up or down. A counterbalancing weight rope/chain 28 connects the top of the mast 22 with the counterbalance weight 26, with a counterbalance weight rope/chain 28 guided through a set of pulleys/sprockets 29. The purpose of the counterbalance weight 26 is to balance the combined weight of mast 22, straight rack gear 30 and float 23 so only a slight push will move up the mast 22 easily, but when it is let go, it will go down by itself until the attached float 23 thereto rests on the water. Balancing of mast 22 helps all the waves' lifting power to be used to turn shaft 33 for power generator 36 to produce electricity. The system prevents waste of energy for lifting the heavy weight of the mast 22, the gear rack 30 and float 23.

Figure 6:
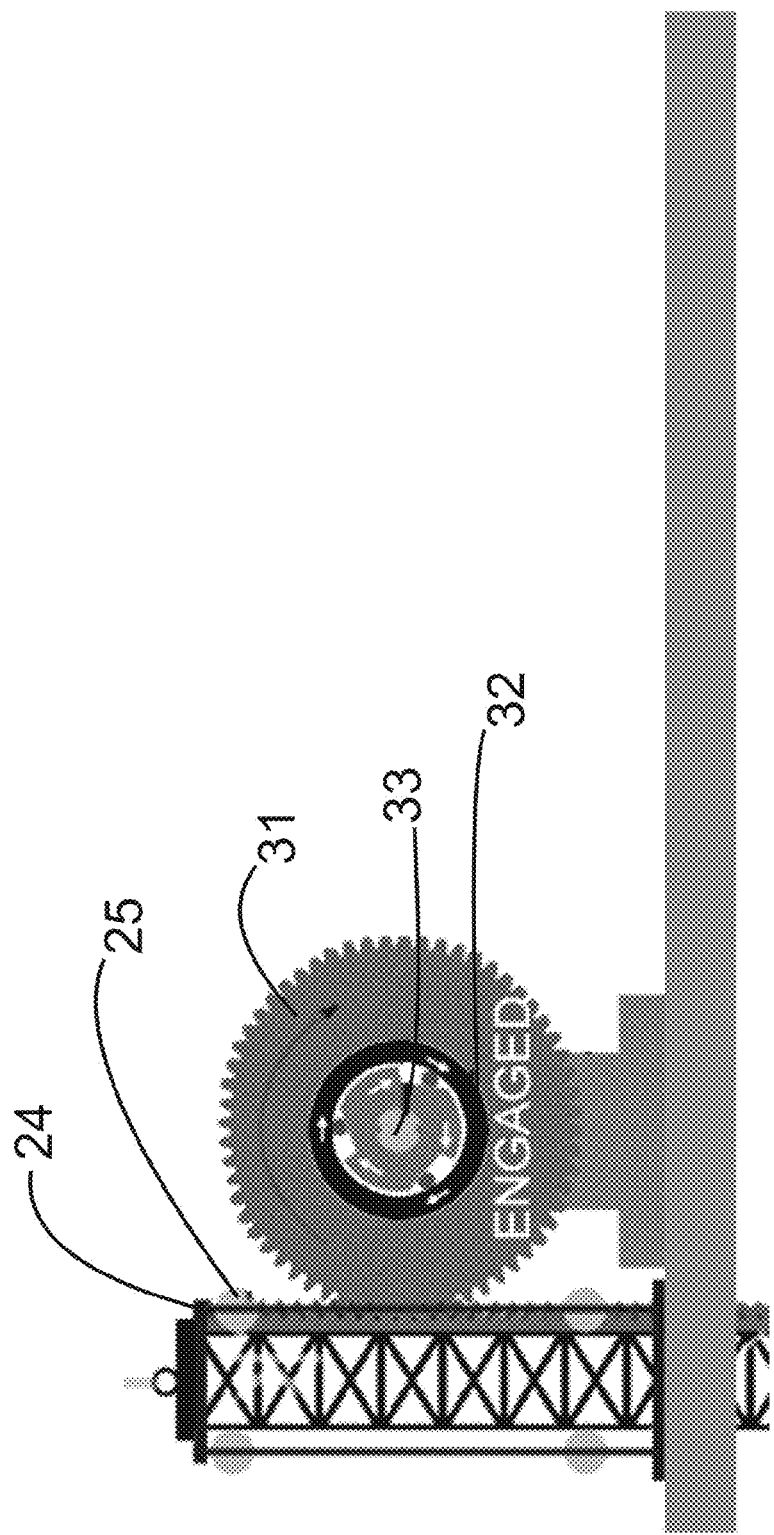
FIG. 6 presents a better view of the one-way clutch power transfer mechanism on FIG. 5.

As shown in FIG. 5 and FIG. 6, as a wave rises and lifts up the float 23 and its attached mast 22, the straight gear rack 30 on mast 22 engages a spur gear 31 and turns it clockwise together with one-way clutch 32 converting the linear movement of the mast-float assembly 22-23 into a one-way rotational motion, turning the shaft 33, and powering the generator 36.

Figure 7:
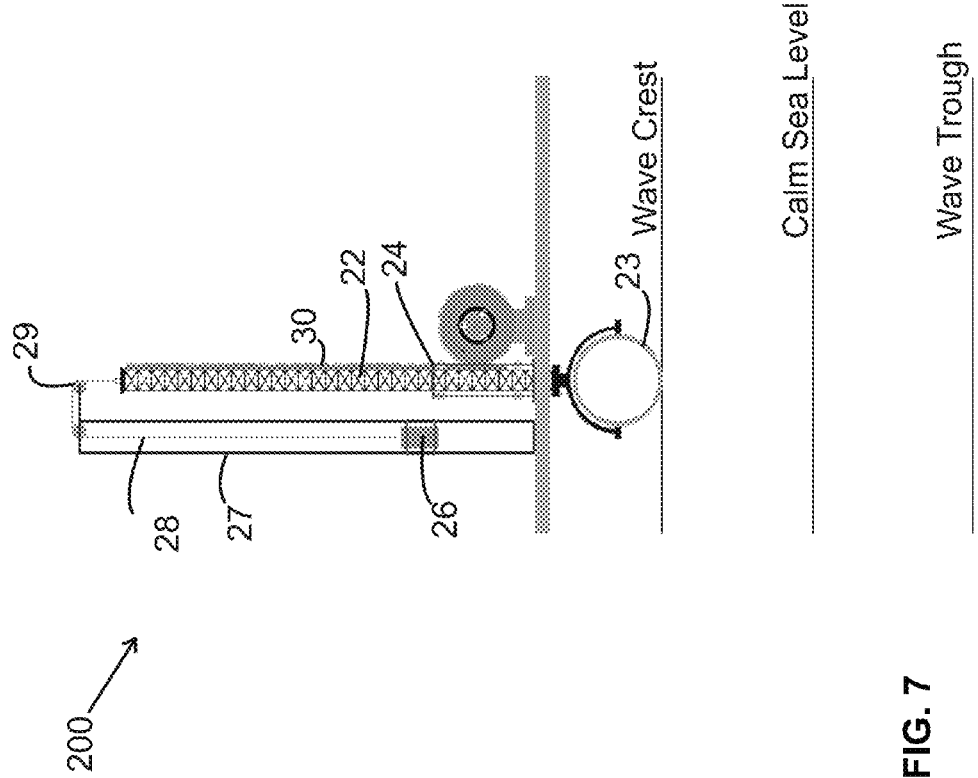
FIG. 7 depicts another embodiment of a vertical mast wave power harvesting element using extendable boom to convert the vertical up-down movement of the mast into rotational.
Figure 8:
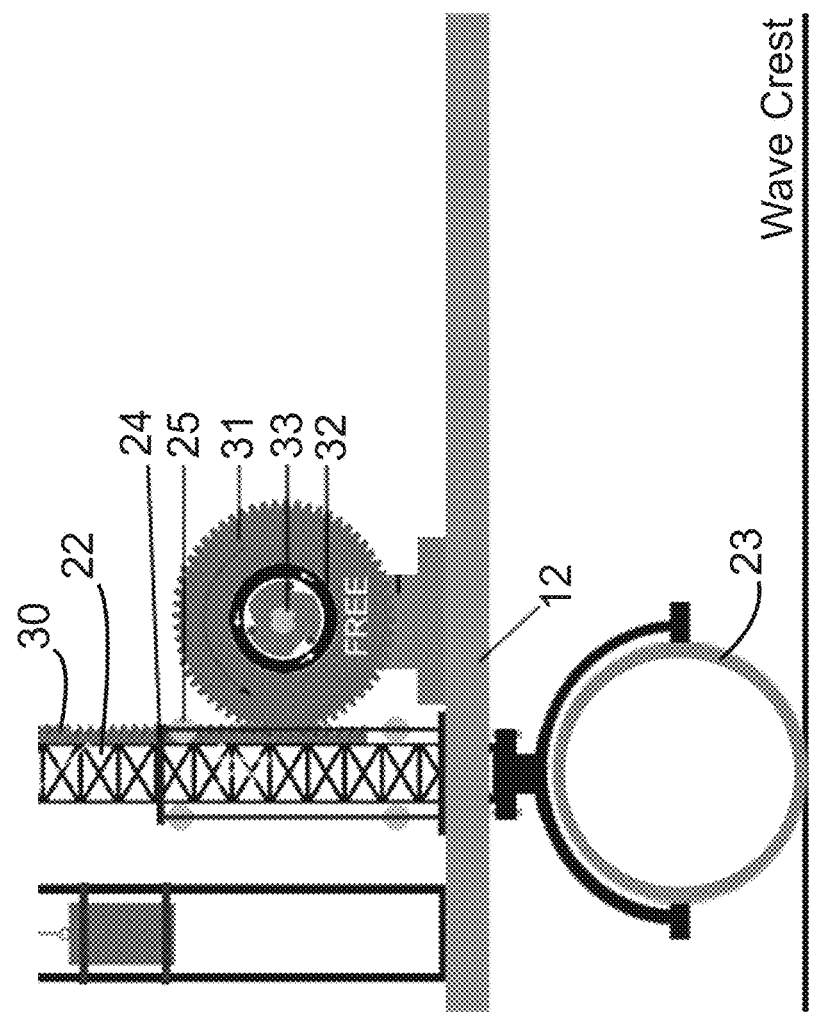
FIG. 8 presents a better view of the one-way clutch-power-transfer mechanism on FIG. 5.
Figure 9:
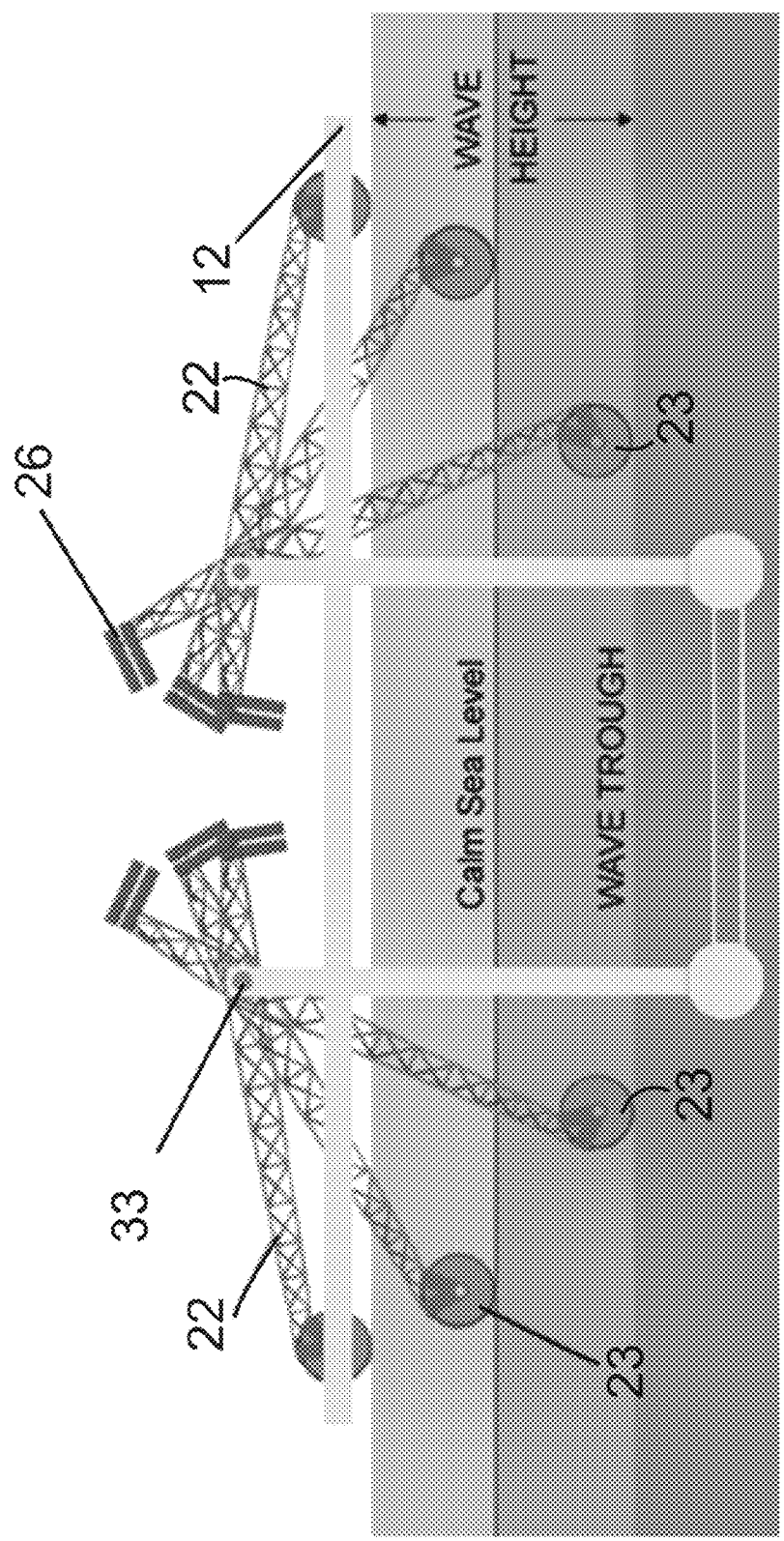
FIG. 9 depicts an embodiment of a wave power harvesting system using balanced torque arms and a one-way power transfer mechanisms to convert the up-down wave movement into rotational to turn a generator.
Figure 10:
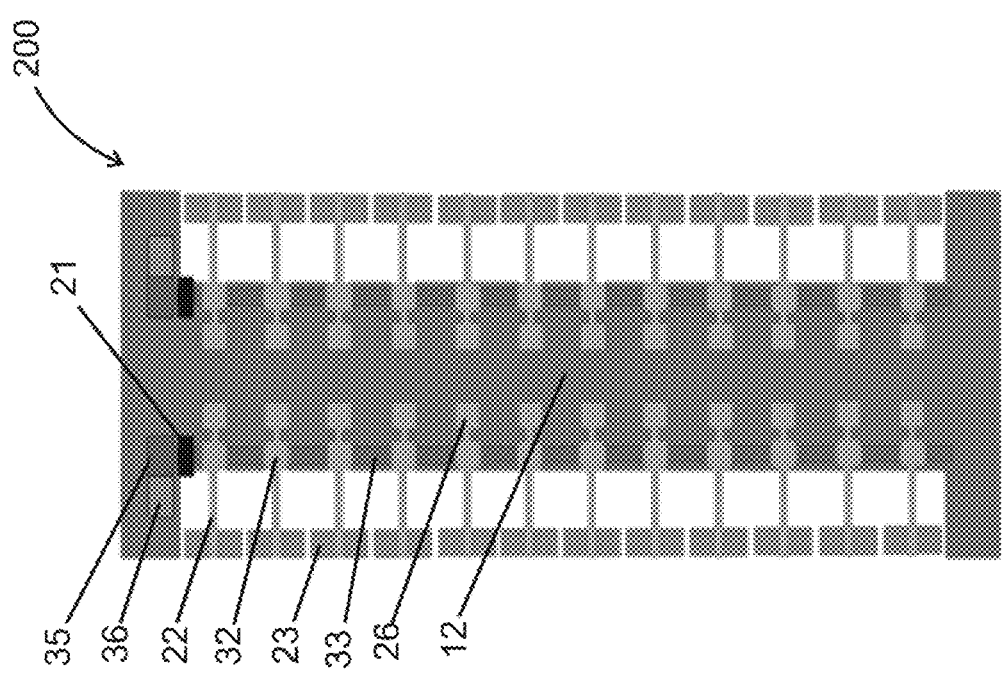
FIG. 10 shows a top view of a 2-shaft balanced-torque-arms wave power harvesting system.

According to FIG. 7 and FIG. 8, as mast 22 starts going down, the straight gear rack 30 turns the spur gear 31 and the one-way clutch 32 in the counterclockwise direction. One-way clutch 32 now is in freewheeling mode while shaft 33 continues its clockwise rotation maintained by flywheel 34 and the other elements 200 of the raw installed on the same shaft 33.

Another embodiment of a Wave Power Harvester device 20 of the present invention 100 is disclosed on FIGS. 9 to 12. The Wave Power Harvester 20 comprises of a floating platform deck 12; plurality of wave energy harnessing elements 200 installed on the floating platform 12; one or more shafts 33 collecting energy from the wave energy harnessing elements 200 comprising of a torque arm 22, float 23 and counterbalance weight 26; a flywheel 21; a gearbox speed increaser 35; and a power generator 36.

Each wave energy harnessing element 200 includes a torque arm 22, a float 23; a counterbalance weight 26; a one-way clutch 32, or a pawl 32A and a ratchet 32B installed on the shaft 33 and a pawl 32A affixed on torque arm 22. A high buoyancy float 23, installed at the end of the long section of torque arm 22, sits on the water. A torque arm balancing counterweight 26 is installed at the end of the short section of the torque arm 22. The purpose of the counterbalance weight 26 is to balance the weight of the ratchet arm 22 and the installed on it float 23 to a point when only a slight push of torque arm 22 upward will make it pivot easily around shaft 33, but when let go, it will go down by itself until the float 23 attached to it rests on the water. The balancing of torque arm 22 helps all the wave lifting power to be applied to the turning of the shaft 33, producing electricity by the generator 36. This prevents energy waste by lifting a heavy ratchet arm and a float.

As a wave rises and lifts up the float 23, as well as the torque arm 22 attached to it, the torque arm 22 turns the one-way clutch/ratchet 32 and the shaft 33 affixed thereon. The shaft 33 and the flywheel 21 installed on it will turn the speed-increasing gearbox 35 and rotate power generator 36. As the wave falls down, float 23 and torque arm 22 will follow. The one-way clutch/ratchet 32 disengages from turning shaft 33 and goes into freewheeling mode.

If both embodiments of the Wave Power Harvester device 20 are positioned so that shafts 33 are perpendicular to the waves' front, then each wave will raise one-after-the-other all floats 23 attached to masts/torque arms 22 which will turn and rotate shafts 33 and power generators 36 connected to shafts 33 continuously as long as there are waves.

Figure 13:
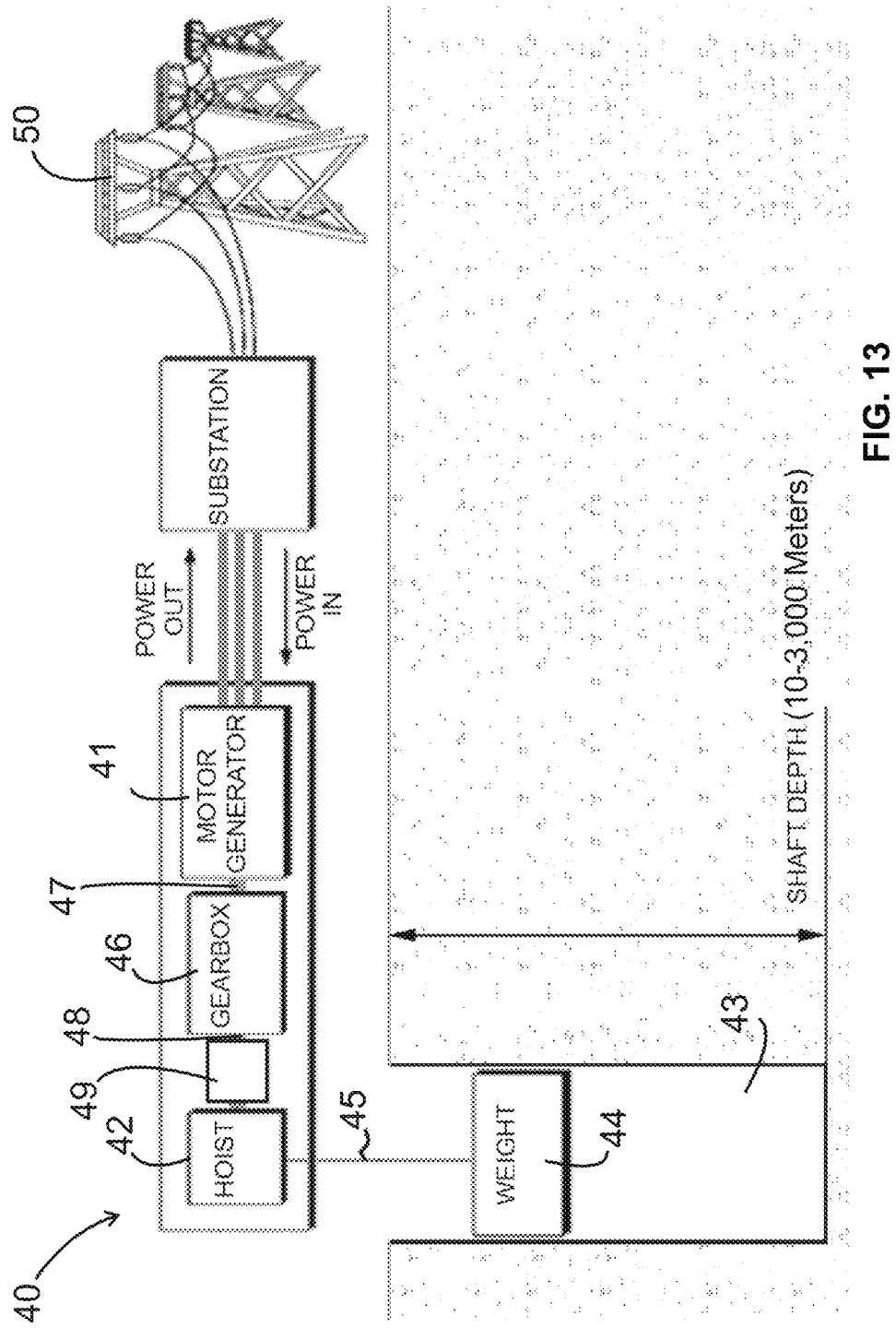
FIG. 13 depicts a single-elevator-shaft gravitational energy storage facility and a single solid mass element transported up-down by a hoist elevator system according to the present invention.

The system 100 further comprises an energy storage and delivery module 40. According to FIG. 13, the energy storage and delivery system of a preferred embodiment of the present invention 40 comprising a Gravitational Energy Storage facility 40 wherein electric motor-generator 41 powers a vertical elevating device/hoist 42 installed above a deep vertical elevator shaft 43 bored in the ground.

A solid mass element/weight 44 such as a concrete, steel or lead cylindrical body, is suspended from cables 45 wound around the cable spool of the hoist 42. The electric motor-generator 41 is mechanically connected to speed reducing gearbox 46 by a first shaft 47. The speed reducing gearbox 46 is further connected to hoist 42 by a second shaft 48.

In energy absorption mode, the motor function of the electric motor-generator 41 provides the work to lift the solid mass element/weight 44 up against the force of the gravity inside deep vertical shaft 43. At low power grid load 50, the electric motor-generator 41 is connected to receive electrical energy from the Wave Power Harvester 20 or from the power grid 50. The motor function of the electric motor-generator 41 is engaged which causes the hoist 42 to lift the solid mass element/weight 44 upwards inside the vertical elevator shaft 43. This increases the gravitational energy potential of the solid mass element/weight 44. The gravitational energy of the solid mass/weight 44 at higher elevation is maintained until electrical energy is demanded by the power grid 50, at which time a holding brake 49 on the hoist shaft 42 is released and the solid mass/weight 44 is allowed to descend controllably by gravity force and, through gearbox 46 acting as rotational speed increaser, drive the motor-generator 41 generating electricity for the power grid 50.

Figure 14:
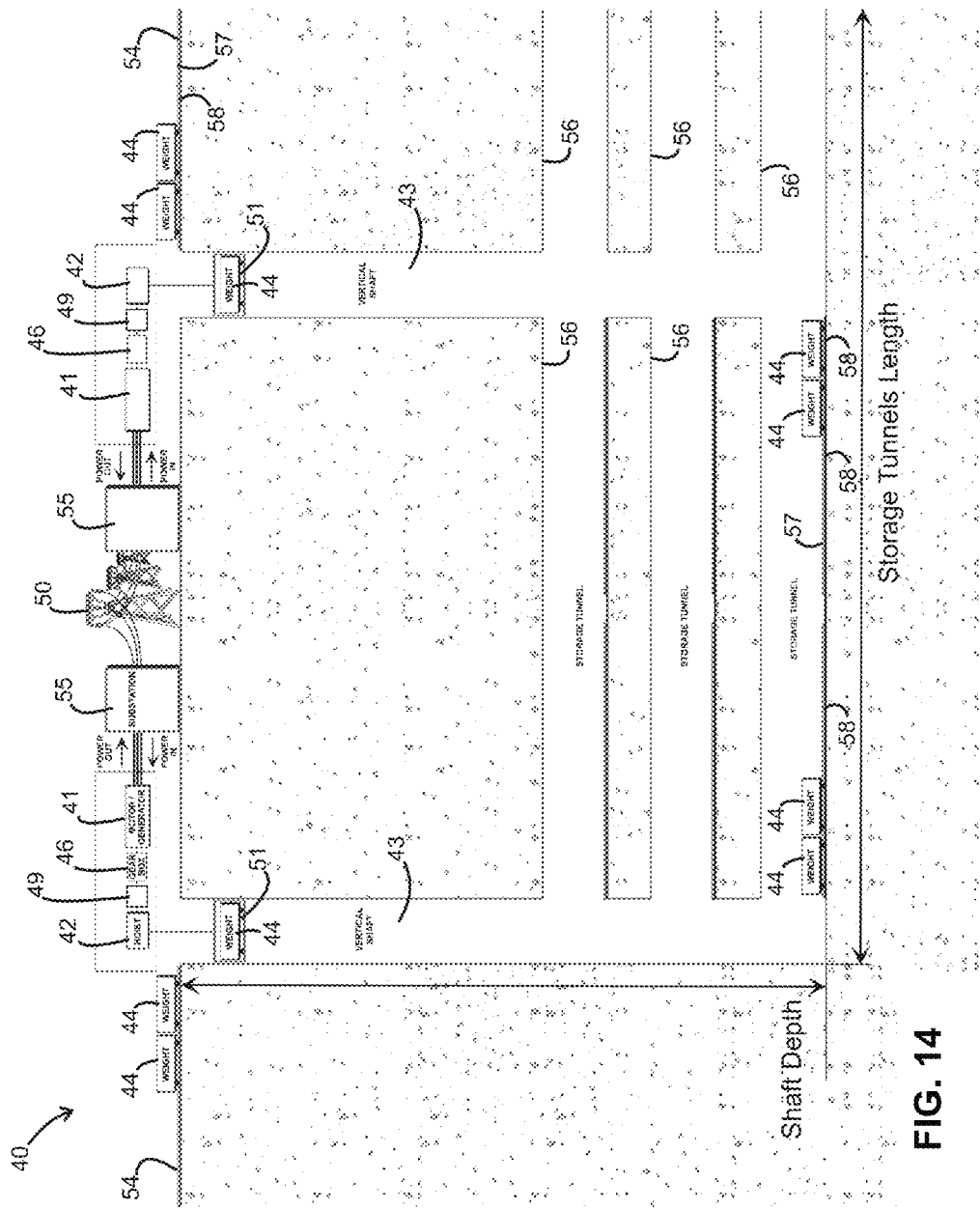
FIG. 14 shows another embodiment of a gravitational energy storage facility with multiple elevator shafts, multiple wheeled solid mass elements and surface and underground tunnel storage areas for wheeled solid mass elements transported between surface and tunnel storage areas by a hoist elevator system in elevator cage according to the present invention.

Another embodiment of the Gravitational Energy Storage module 40 according to the present invention 100 is described in FIG. 14. The Gravitational Energy Storage facility 40 comprises of two or more vertical shafts 43 bored into the ground; a hoist 42 installed above each vertical shaft 43 and powered by electric motor-generator 41 via gearbox 46; an elevator cage 51 with rail road-type track 58 installed on its floor and suspended from each hoist 42 and positioned within the vertical shaft 43; plurality of wheeled solid mass elements 44; one or more underground horizontal storage tunnels 56 connecting shafts 43 at and above their bottom to serve as multilevel underground storage for "discharged" solid mass elements 44; and surface tracked storage yard 54 for storage of "charged" solid mass elements 44 waiting to release their gravitational potential energy as electric energy to be injected it into the power grid 50.

In energy absorption/"charge" mode, one-after-the-other the wheeled solid mass elements/weights 44 stored in the horizontal tunnels 53 linking vertical shafts 43 are loaded onto elevator cages 51 and lifted up to surface solid mass elements/weight-storage yard 54 and lined up.

In energy release/"discharge" mode, when power grid 50 needs more energy, surface-stored solid mass elements 44 are loaded onto the elevator cage 51, the holding brake 49 on hoist shaft 42 is released and elevator cage 51, loaded with solid mass element 44, is allowed to descend controllably by gravity force and turn motor-generator 41 via gearbox 46. The power generation function of electric motor-generator 41, driven by the descending solid mass element/weight 44, generates electricity which is injected into power grid 50 after Volt-Amp/Frequency conditioning in substation 55. Sequential "discharge" of solid mass elements 52 at multiple elevator shafts 43 would provide lower power for longer time duration. Simultaneous "discharge" would provide higher power for shorter time duration.

Similar to a multi-level residential or commercial elevator, upon reaching a storage tunnel 56 with available storage, the elevator cage 51 is lined with tunnel's floor railing 58 and the "discharged" wheeled solid mass element/weight 44 is unloaded and stored in the tunnel until next "charging" time.

Low duty chain transporters 57 may be used to push/pull wheeled solid mass elements/weights 44, stored on the surface weight-storage yard 54 and inside underground horizontal tunnels 56. Wheeled solid mass elements 44 are carried closer to or away from vertical shaft 43, and load/unload in/out of elevator cage 51 for lowering the solid mass elements/weights 44 in energy-release cycle or raising them in energy-absorption cycle.

Figure 15:
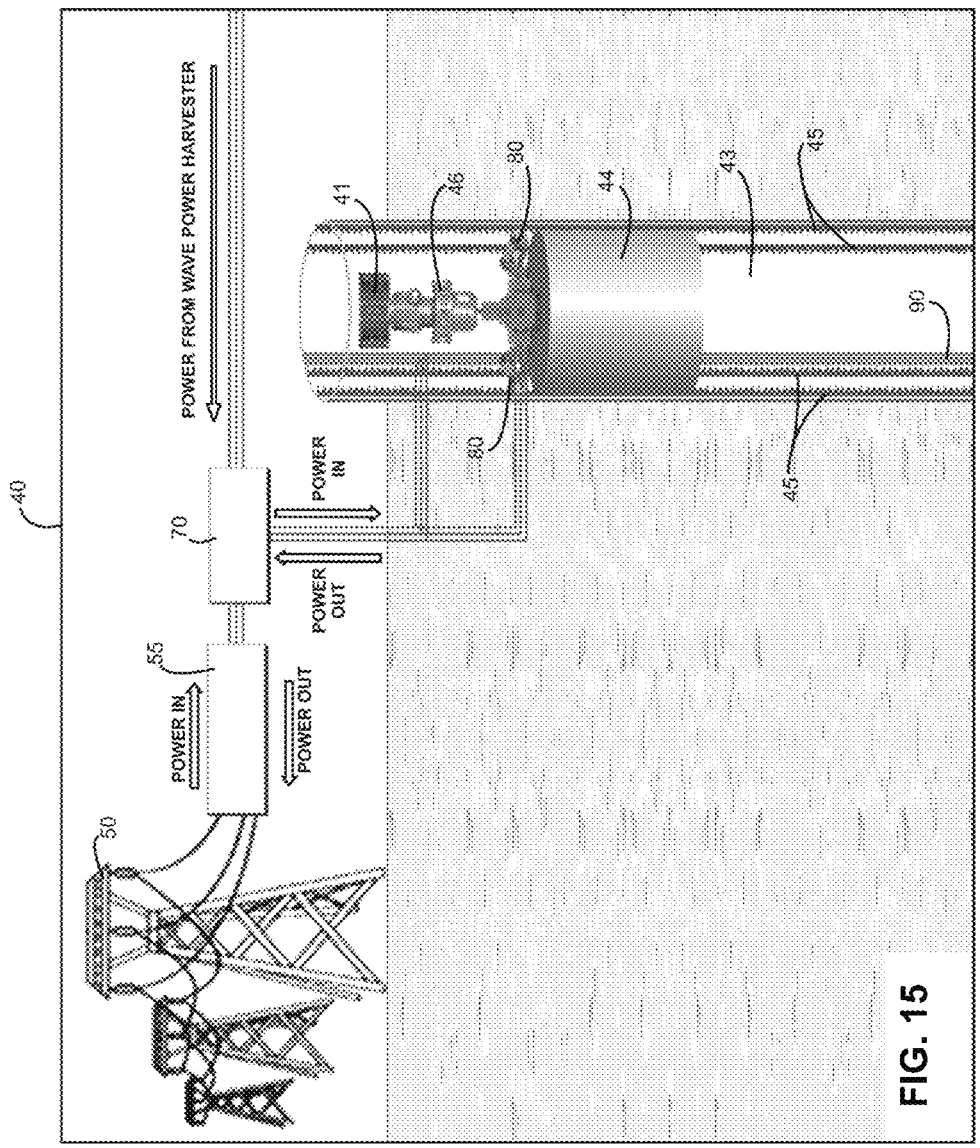
FIG. 15 depicts a rack-and-pinion elevator installed on top of a single solid mass element to move it up-down in a single-elevator-shaft gravitational energy storage facility.

According to FIG. 15, a preferred embodiment of a rack-and-pinion vertical elevation system for a single shaft-single solid mass element Energy Storage module 40 of the present invention comprises a set of straight rack gears 45 installed on the walls of vertical elevator shaft 43, an electric motor-generator 41, a speed reducer/increaser gearbox 46 and a set of pinion drives 80 mounted on top of the solid mass element/weight 44 for raising the solid mass element 44 to a higher elevation inside deep vertical shaft 43 in energy absorption/"charge" mode by climbing on rack gears 45. A power sensor/controller 70 monitors the grid 50 and controls the flow of energy between the Wave Power Harvester 20, the Power Storage module 40 and the grid 50. On demand for energy storage, the power sensor/controller 70 connects the electric motor-generator 41 to the source of electrical energy via power rail 90 to raise the solid mass element 44 of the Power Storage 40 from a position of relatively low potential energy to a position of relatively higher potential energy in said deep vertical shaft 43 in energy absorption mode. When the grid 50 needs power from the Power Storage 40, the power sensor/controller 70 sends power to the spring-locked electric brakes of the rack-and-pinion drives 80 and releases them allowing the solid mass element 44 to descend controllably to a relatively lower potential energy position turning the electric motor-generator 41 in power generation mode.

Figure 16:
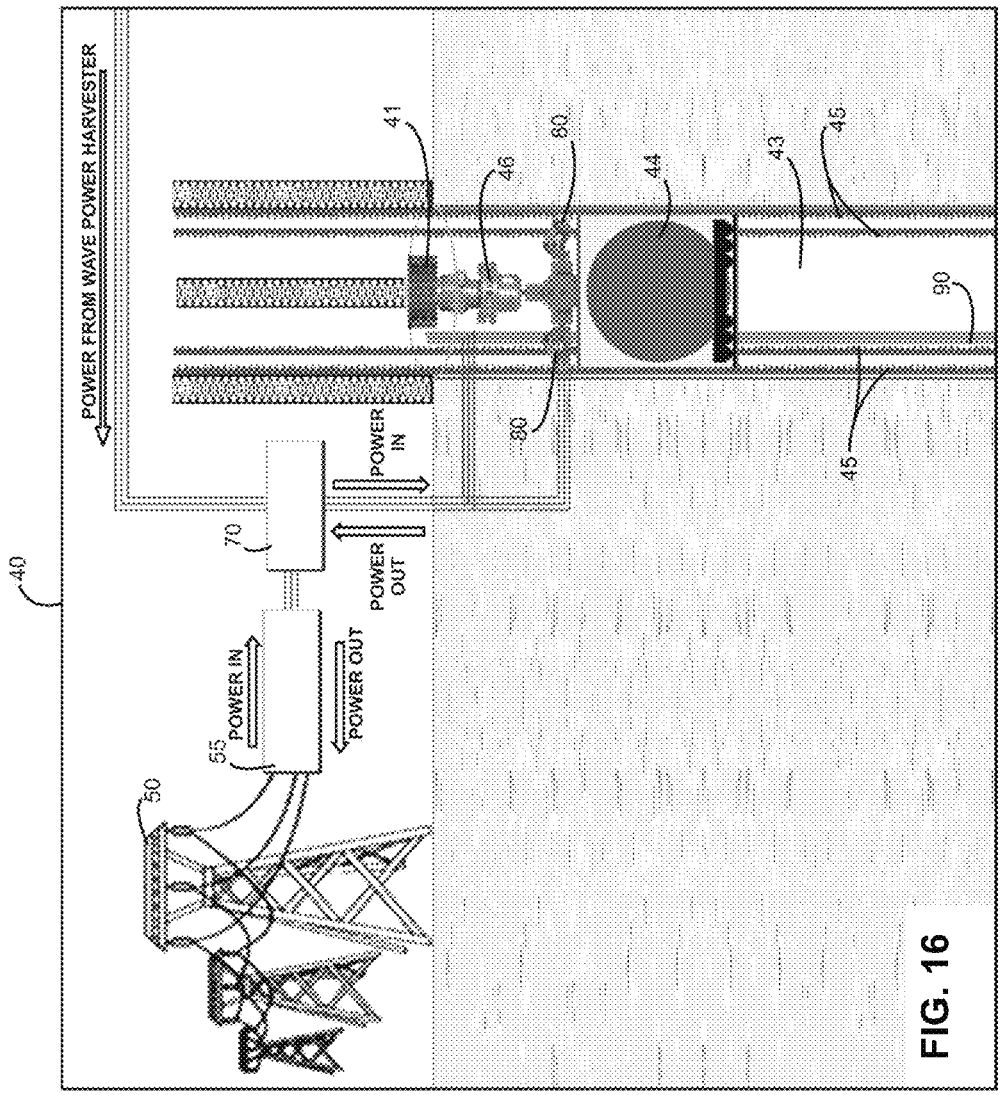
FIG. 16 depicts a rack-and-pinion elevator installed on top of an elevator cage to move wheeled solid mass elements between the surface and the underground tunnel storage areas of a gravitational energy storage facility with multiple elevator shafts, multiple wheeled solid mass elements and surface and underground tunnel storage areas for wheeled solid mass elements.

Another preferred embodiment of a rack-and-pinion vertical elevation system for a Gravitational Energy Storage module 40 with multiple elevator shafts, underground storage tunnels and multiple solid mass elements is shown on FIG. 16. It is functionally similar to the rack-and-pinion vertical elevation system on FIG. 15 but, instead of the rack-and-pinion elevator being installed on top of solid mass element 44, it is installed on top of the elevator cage.

The rack-and-pinion elevator system, consisting of a set of straight rack gears 45 installed on the walls of vertical elevator shaft 43, a motor-generator 41, a gearbox 46 and a set of pinion drives 80, installed on top of elevator cage, transports wheeled solid mass elements 44 loaded into the elevator cage inside deep vertical shaft 43 between the surface and underground storage tunnels to absorb and release energy.

In one embodiment of the present single-elevator-shaft of the gravitational energy storage facility, the shaft has a depth of 3000 m, with diameter of 16 m. A weight made of Lead having a mass of about 225,000 tons (plus electric motor-generator's weight) is moved by a rack-and-pinion elevator powered by the electric motor-generator between 2900 m shaft depth and surface level (0 m). This will result in storage and release of about 1.3 GWh electric energy. This is the energy storage capacity that all utilities in the world need and want. This should be compared with the largest grid storage batteries in the United States, which include the 31.5 MW battery at Grand Ridge Power plant in Illinois and the 31.5 MW battery at Beech Ridge, W. Va.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An energy storage and retrieval module comprising:
    a) two or more deep vertical shafts bored into the ground at a predefined distance between each other;
    b) one or more horizontal tunnels with a railroad like tracks connecting said deep vertical shafts, serving as a storage yard;
    c) a plurality of wheeled masses configured to ride on said railroad-like tracks, and
    d) an elevator system with a cage with open sides and with a tracked floor to receive said wheeled masses positioned in each said deep vertical shaft.

2. A system for water wave amplification, wave energy harnessing, and energy storage to utilize a water wave having a wave length, a wave height, a wave trough, and a wave speed, comprising:
    a) a wave amplifier system comprising:
        a semisubmersible platform having a set of buoyancy control columns, a set of support beams, and a bottom section, and is anchored to an ocean/sea floor;
        a plurality of shoaling plates each having a high rear-end and a low front-end, sloping at a predetermined angle, and installed at the bottom section of said semisubmersible platform and supported by said set of support beams, and submerged below a wave base to act as a false near-shore ocean/sea floor to form a shallow water region, and
        a buoyancy control system to maintain said high rear-end of each said shoaling plate below said wave trough;
    b) a wave power harvester system, and
    c) an energy storage and retrieval system comprising:
        i) a deep vertical elevator shaft bored into the ground;
        ii) a solid mass element;
        iii) a vertical transportation system comprising of a rack-and-pinion vertical elevation system, a set of holding breaks for moving said solid mass element inside said vertical elevator shaft;
        iv) a control system, wherein a first control sequence causing said vertical transportation system powered by a motor-generator to move said solid mass element inside said vertical elevator shaft from a position of relatively low potential energy to a position of relatively higher potential energy in an energy storing mode, and a second control sequence causing release of a holding brake of said vertical transportation system allowing said mass element to controllably descend and turn a motor-generator of said vertical transportation system generating electricity in response to said lowering of said mass element from a position of relatively higher potential energy to a position of relatively low potential energy in an energy delivery mode;
        v) one or more underground horizontal storage tunnels to serve as multilevel underground storage, wherein each said horizontal storage tunnel having a set of surface tracks for horizontal movement of a set of wheeled masses, wherein each said wheeled mass is loaded into an elevator cage to be lifted or lowered for storage or retrieval of energy.

3. The system of claim 2, further comprises of a variable-speed gearbox.

4. The system of claim 2, further comprises of a power in/out conditioning substation.

5. A system for water wave amplification, wave energy harnessing, and energy storage to utilize a water wave having a wave length, a wave height, a wave trough, and a wave speed, comprising:
- a) a wave amplifier system comprising:
  - i) a semisubmersible platform having a set of buoyancy control columns, a set of support beams, and a bottom section, and is anchored to an ocean/sea floor;
  - ii) a plurality of shoaling plates each having a high rear-end and a low front-end, sloping at a predetermined angle, and installed at the bottom section of said semisubmersible platform and supported by said set of support beams, and submerged below a wave base to act as a false near-shore ocean/sea floor to form a shallow water region, and
  - iii) a buoyancy control system to maintain said high rear-end of each said shoaling plate below said wave trough;
- b) a wave power harvester system, and
- c) an energy storage and retrieval system comprising:
  - i) a deep vertical elevator shaft bored into the ground;
  - ii) a solid mass element;
  - iii) a vertical transportation system comprising of a rack-and-pinion vertical elevation system, a set of holding breaks for moving said solid mass element inside said vertical elevator shaft;
  - iv) a control system, wherein a first control sequence causing said vertical transportation system powered by a motor-generator to move said solid mass element inside said vertical elevator shaft from a position of relatively low potential energy to a position of relatively higher potential energy in an energy storing mode, and a second control sequence causing release of a holding brake of said vertical transportation system allowing said mass element to controllably descend and turn a motor-generator of said vertical transportation system generating electricity in response to said lowering of said mass element from a position of relatively higher potential energy to a position of relatively low potential energy in an energy delivery mode;
  - v) a hoist installed above a deep vertical elevator shaft bored in a ground and powered by an electric motor-generator, and further having a mass that is suspended from a cable that is wound around a cable spool of the hoist, and wherein the electric motor-generator is mechanically connected to a speed reducing gearbox by a first shaft, and the speed reducing gearbox is further connected to the hoist by a second shaft,
    - whereby in an energy storage mode, the electric motor-generator causes the hoist to lift the mass upwards inside the vertical elevator shaft increasing the gravitational energy potential of the solid mass element/weight, wherein the gravitational energy of the mass at a higher elevation is maintained until electrical energy is demanded by a power grid, at which time a holding brake on the hoist shaft is released and the mass is allowed to descend by gravity, driving the motor-generator and generating electricity.

* * * * *